No. 672,031. Patented Apr. 16, 1901.
J. N. CLOUSE.
WHEEL RETAINER.
Application filed Nov. 19, 1900.
(No Model.)
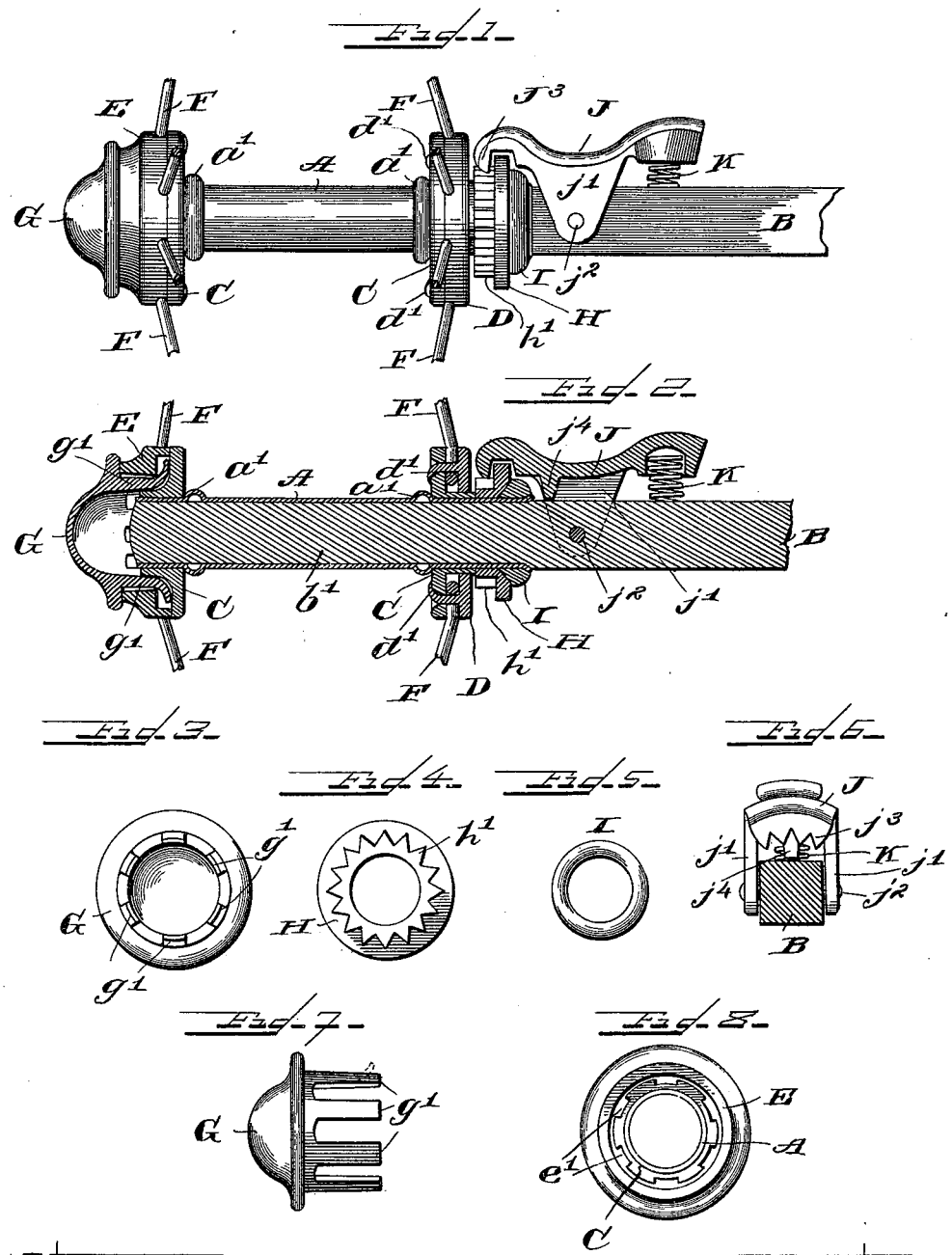

UNITED STATES PATENT OFFICE.

JOSEPH N. CLOUSE, OF ST. LOUIS, MISSOURI, ASSIGNOR TO ANTON BOEKER, OF SAME PLACE.

WHEEL-RETAINER.

SPECIFICATION forming part of Letters Patent No. 672,031, dated April 16, 1901.

Application filed November 19, 1900. Serial No. 37,081. (No model.)

*To all whom it may concern:*

Be it known that I, JOSEPH N. CLOUSE, a citizen of the United States, residing at the city of St. Louis, State of Missouri, have invented new and useful Improvements in Wheel-Retainers, of which the following is a specification.

My invention relates to improvements in wheel-retainers such as are used on children's carriages and small wheeled vehicles to retain the wheel on the axle without the use of the ordinary nut; and the objects of my invention are, first, to take away the unfinished appearance of a nut; second, to provide a quicker and easier means of taking off and putting on the wheels, and, third, to retain the wheel in such a way that the outer end of the hub may be capped over, so as to give a more finished appearance to the wheel and retain the leakage of black grease and oil from the bearings of the axles. I attain these objects by the mechanism illustrated in the accompanying drawings, in which—

Figure 1 is a view of one end of an axle, showing a hub with my attachments complete. Fig. 2 is a vertical center-cut section showing the end of an axle with its bearing and the hub-box and retaining parts in position. Fig. 3 is an inside view of the clench-cap. Fig. 4 is an inside view of the toothed flanged swivel. Fig. 5 is a face view of a drive washer or collar. Fig. 6 is a cross-cut section of the axle, showing the teeth in the end of the dog or clutch. Fig. 7 is a side view of the clench-cap. Fig. 8 is an end or face view of the two plates of the one end of the hub, showing the openings for the tangs of the clench-cap, in all of which views like letters refer to like parts.

A is a rolled sheet-metal tubular box provided with two raised beads $a'$ $a'$.

B is one end of the axle, with its bearing $b'$.

C is the inside plate of the hub, and D is the outside plate of the inside end of the hub, which is provided with a series of tangs $d'$, which extend through a series of holes in the plate C and clamp the two firmly together onto a series of bent wire spokes F, placed between them and on the outside end of the hub. The two plates C and E are also driven onto the end of the box A and clenched together with the series of wire spokes between them. All of these parts described are common to an existing patent, No. 449,205, dated March 31, 1891.

My improvement consists in adding to the front end of the wheel-hub after the wheel is put together and trued up a clenched cap G, which is provided with a series of tangs $g'$, which enter the new openings $e'$, made, Fig. 8, between the plates C and E, and as it is pressed down to the shoulder or bead the tangs $g'$ come against the plate C and are bent around behind the plate E and securely clenched on the cap G, so as to give a finish to the front end of the wheel. Then I extend out the back end of the box A long enough to receive the toothed and flanged swivel-piece H, which fits the box A loosely, so as to turn around on it, and a drive washer or collar I, which is driven onto the box A after the said swivel H and retains it in position, as shown. Then to the square part of the axle B, I pivot a dog or clutch J by means of two ears $j'$ $j'$ and a rivet $j^2$. The said dog or clutch, extending out in one direction to form a lever with a coiled spring K under it and against the axle and in the other direction toward the wheel, terminates in a toothed portion $j^3$, that fits into the teeth $h'$ on the swivel H and a groove back of it, that strides the flange of the swivel H, so as to limit its lateral motion, while at the same time the teeth on the dog engage in the teeth on the swivel and prevent it turning with the box when the wheel revolves, the spring serving to retain the dog in its engaged position. By pressing down the lever or spring end of the dog the clutch end is raised and the wheel may be removed. Then to replace the wheel it is only necessary to press it on against the dog, which will raise up and pass over the flange and snap into position. A stop $j^4$ on the under side of the dog or clutch strikes on the top of the axle and prevents the spring from throwing the clutch end of the dog too low to snap into position by pushing the wheel onto the bearing of the axle. In this manner I improve the hub described in an existing patent, No. 449,205, arranged to be used with the ordinary nut, so that it has a finished appearance, by a cap clenched on the outside of the hub, and retain the hub on the axle by extending the box on the inside of the hub and putting a swivel on it, retained by a collar, and a dog on the axle to engage in the said swivel.

Having thus described my invention, what I claim as new, and desire to secure by Letters Patent, is—

1. In a wheel-retainer the box extended beyond the hub and provided with a toothed and flanged swivel retained on the box by a drive-collar in combination with a dog or clutch provided with teeth adapted to engage with the teeth in the said swivel as shown and described.

2. The combination in a wheel-retainer of a dog or clutch pivoted to the axle and provided with a spring under one end teeth and a groove under the other which engages with a toothed and flanged swivel on the box of the wheel as shown and described.

3. The addition to a wheel-hub of a series of notches in the web portion of the plate E, in combination with a cap having a series of tangs to fit into said series of notches and clench against the plate C as shown and described.

In testimony whereof I affix my signature in presence of two witnesses.

JOSEPH N. CLOUSE.

Witnesses:
 KITTY CARROLL,
 HANNAH M. HOSIE.